United States Patent Office.

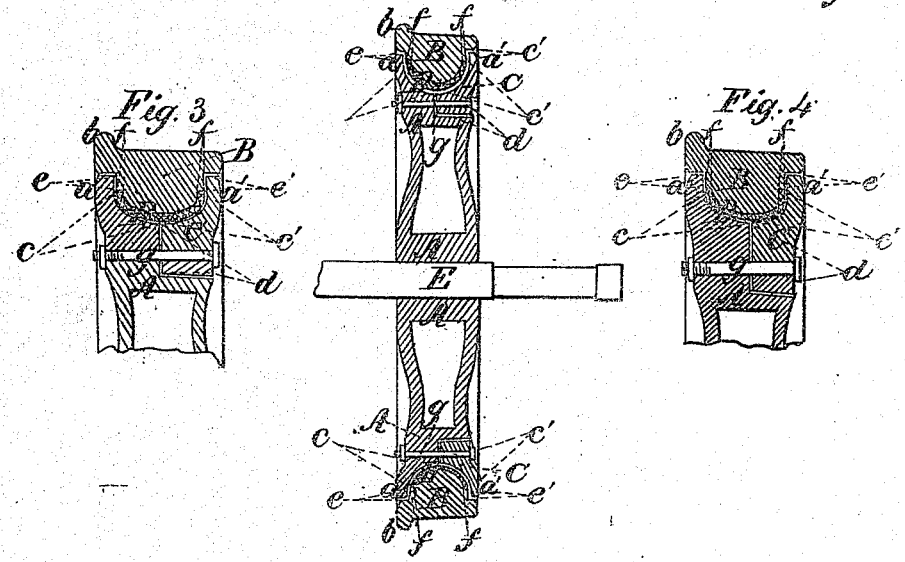
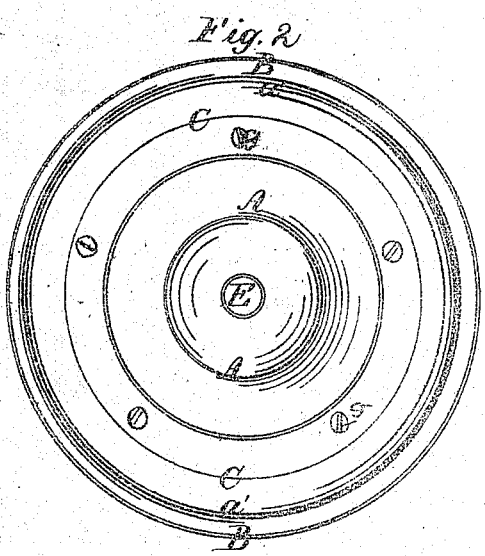

CHARLES K. BRADFORD, OF LYNNFIELD, MASSACHUSETTS.

Letters Patent No. 102,908, dated May 10, 1870; antedated April 29, 1870.

IMPROVED RAILWAY-CAR WHEEL.

The Schedule referred to in these Letters Patent and making part of the same.

*To all persons whom it may concern:*

I, CHARLES K. BRADFORD, of Lynnfield, Essex county, Massachusetts, have invented an Improved Elastic Car-Wheel.

The nature of the invention is in combining a tire, whose inner periphery or surface is convex, with a main wheel and binding-ring, in whose combined periphery there is a concave groove to fit the tire and with an elastic packing-ring, which is crescent-shaped in cross-section, and adapted to fit the convex inner periphery of the tire and the concave groove in the periphery of the main wheel and binding-ring.

The following description and accompanying drawings, with their letters of reference, fully illustrate the invention.

A represents a main wheel of any general form and material.

B represents a tire, whose inner periphery or surface is convex, oval, elliptical, or round.

C represents a binding-ring, to bind the main wheel and the tire together.

D represents a packing-ring of leather, cloth, felt, wool, cotton, caoutchouc, or other elastic material, in shape adapted to fit the convex inner periphery of the tire and the concave groove in the combined periphery of the main wheel and binding-ring.

E represents an axle of the combined wheel.

$a$ represents a flange, which projects radially from the periphery of the main wheel A on the side laterally opposite to the end of the axle E.

$a'$ represents a flange, which projects radially from the periphery of the binding-ring C, on the side laterally next to the end of the axle E.

$b$ represents a flange which projects radially from the outer periphery of the tire B, on the side opposite to the end of the axle E.

$c$ represents a concave groove, which extends from the flange $a$ to the middle of the periphery of the main wheel A.

$c'$ represents a concave groove in the outer periphery of the binding-ring C, which extends from the flange $a'$ to the opposite side.

$d$ represents a radial shoulder or rabbet on the periphery of the main wheel A, for the binding-ring C to fit against, which is made by making the main wheel smaller on the side of the binding-ring than from the inner point of the groove $c$ to the flange $a$.

$e$ represents a radial shoulder on the side of the tire B, for the flange $a$ of the main wheel A to lie against.

$e'$ represents a radial shoulder on the side of the tire B for the flange $a'$ of the binding-ring C to lie against.

$f$ represents a lateral shoulder on each side of the inner or convex periphery of the tire B, for the edges of the packing-ring D to lie against.

$g$ represents a series of holes and screw-bolts laterally through, and to go through, the main wheel A and the binding-ring C, to hold all the parts together.

To combine the parts described, put the packing-ring D within the tire B; put the main wheel A within the combined tire and packing-ring B D, with the flange $a$ next to the shoulder $e$; put the binding-ring C over the main wheel A, and within the combined tire and packing-ring B C, with the flange $a'$ next to the shoulder $e'$, and bind all together by the screw-bolts $g$.

When thus combined, the packing-ring D is entirely inclosed.

I claim—

The combination of a main wheel and tire and binding-ring A B C with a packing-ring, D, which is shaped to fit the combined concave groove $c$ $c'$ and the convex inner periphery of the tire B.

CHAS. K. BRADFORD. [L. S.]

Witnesses:
BENJ. E. COBLEN,
GEORGE T. FRENCH.